B. G. VAUGHAN.
MATCH MAKING MACHINE.
APPLICATION FILED APR. 4, 1907.
1,010,822.
Patented Dec. 5, 1911.
4 SHEETS—SHEET 2.
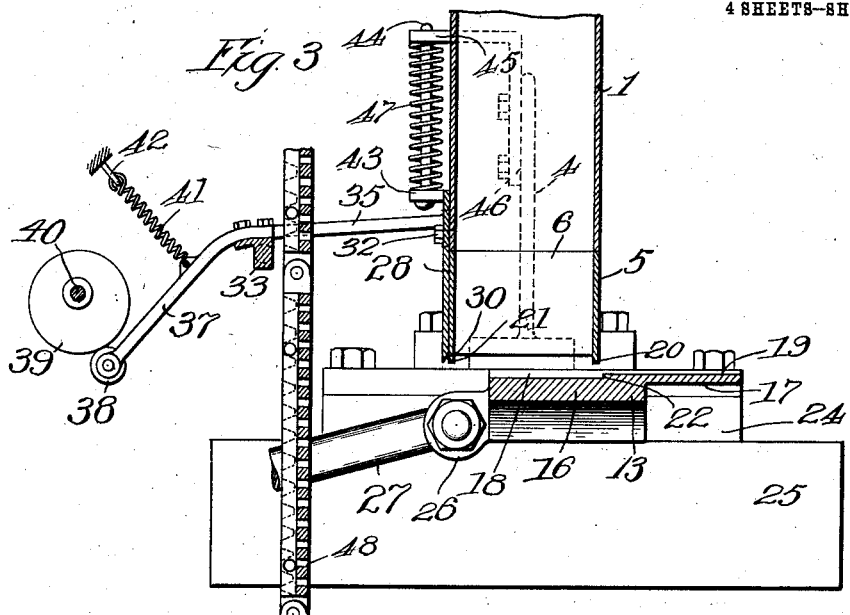
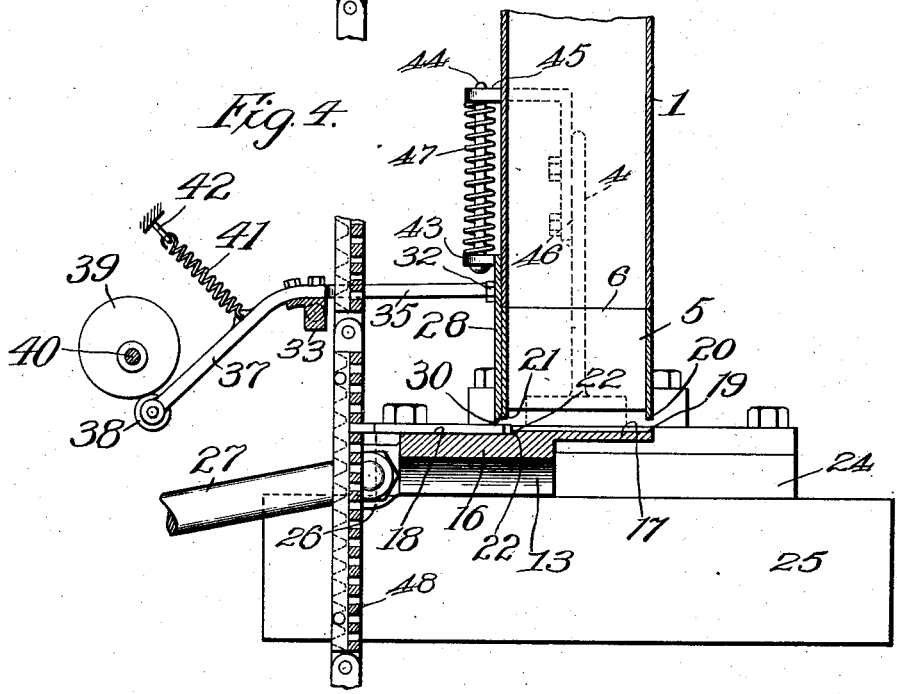
Witnesses:
Julia Fleischer
E. J. Smith
Inventor:
Bernard George Vaughan
By John H. Garnsey
Atty.

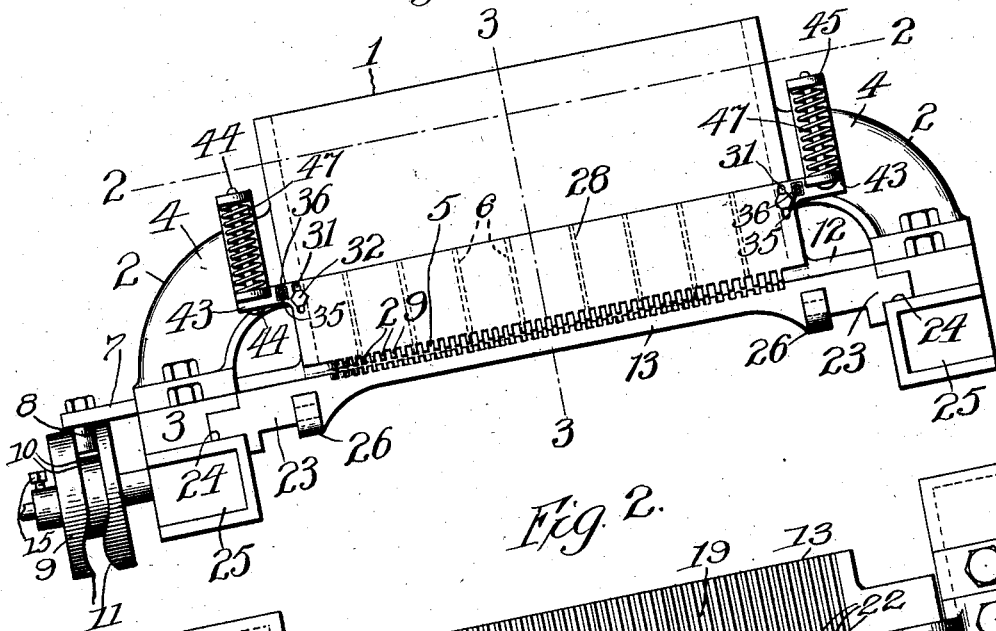
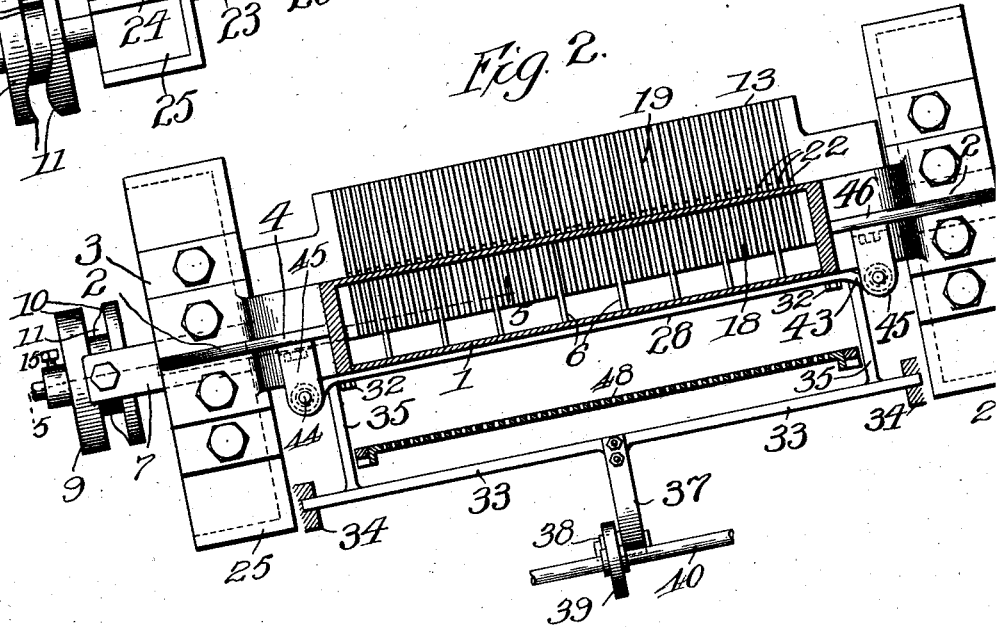

B. G. VAUGHAN.
MATCH MAKING MACHINE.
APPLICATION FILED APR. 4, 1907.
1,010,822.
Patented Dec. 5, 1911.
4 SHEETS—SHEET 3.
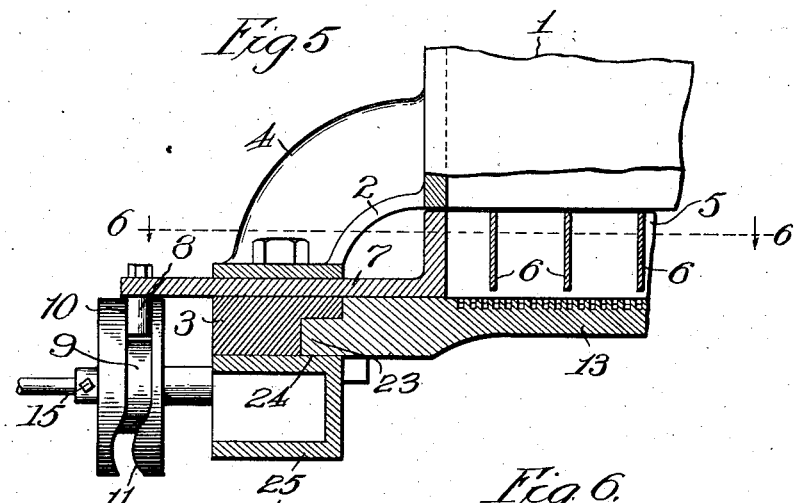
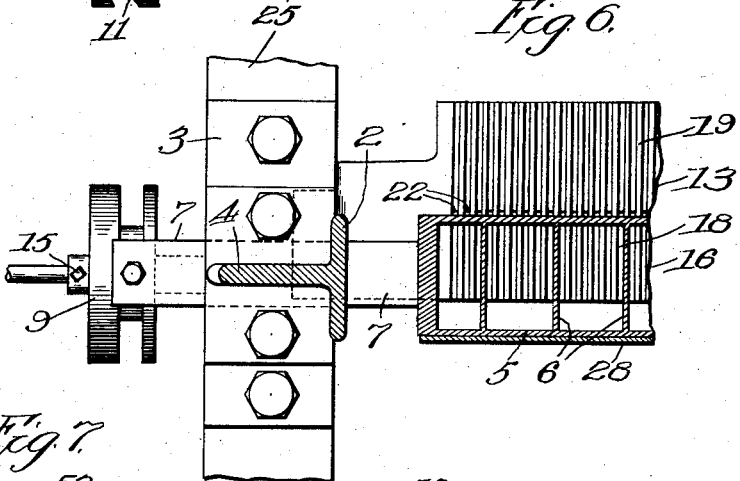
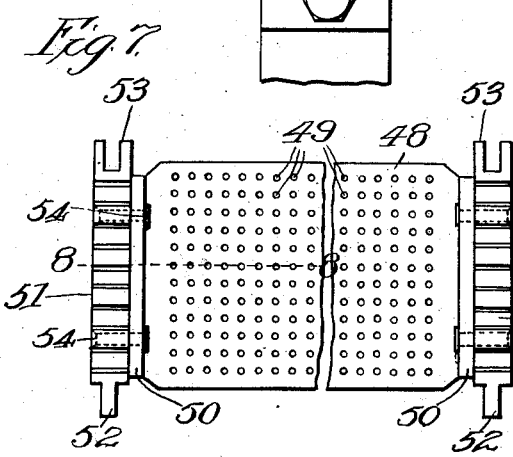
Inventor
Bernard George Vaughan

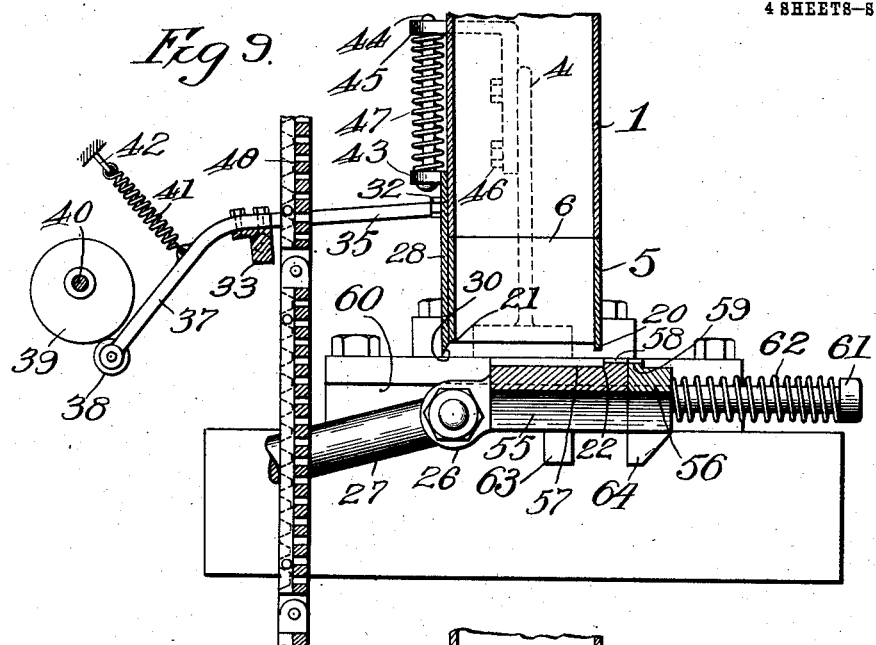
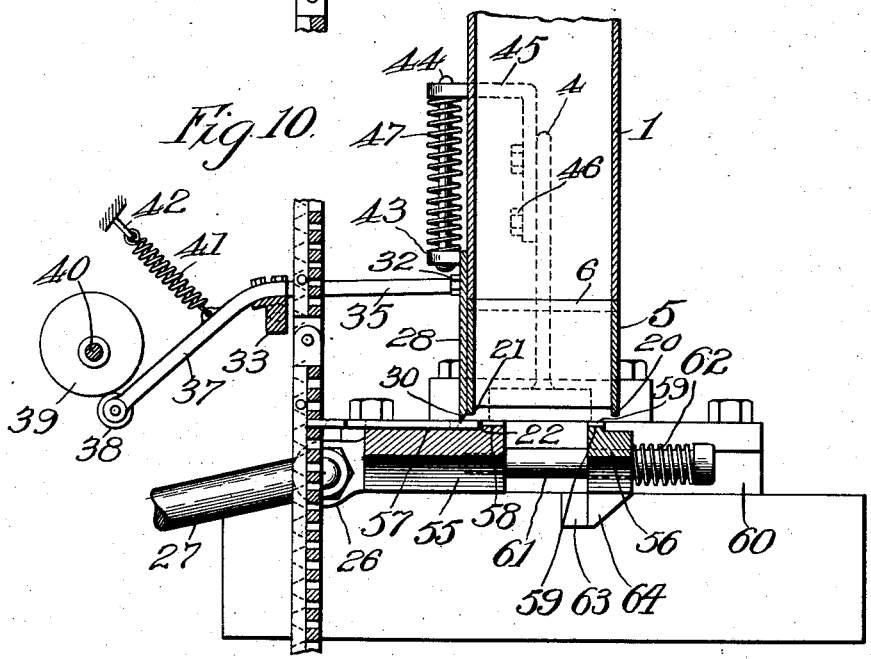

UNITED STATES PATENT OFFICE.

BERNARD G. VAUGHAN, OF JOLIET, ILLINOIS, ASSIGNOR TO NATIONAL MATCH COMPANY, A CORPORATION OF ILLINOIS.

MATCH-MAKING MACHINE.

1,010,822.   Specification of Letters Patent.   Patented Dec. 5, 1911.

Application filed April 4, 1907. Serial No. 366,394.

*To all whom it may concern:*

Be it known that I, BERNARD G. VAUGHAN, a citizen of the United States, residing at Joliet, in the county of Will and State of Illinois, have invented certain new and useful Improvements in Match-Making Machines, of which the following is a specification.

This invention relates to improvements in match making machinery and has to do more particularly with devices for assorting and selecting the splints and setting the same in the dipping plates.

The invention includes generally a main receptacle or hopper for receiving the splints in bulk and a feeder to which the hopper delivers and from which feeder the splints are received by a setting head, which is reciprocated into receiving and delivering positions and which delivers the splints received from the feeder, preferably by inserting them into a dipping plate.

One of the novel features of this invention consists in the provision of an improved form of setting head which broadly considered is provided with supporting and receiving means, the former serving to support the splints in the feeder when the head is in a delivering position and the latter serving to receive the splints and carry them forwardly to the dipping plates. In the most improved embodiment of my invention the supporting means of the setting head is so constructed as to also perform the function of a positioning device and serves to position the splints when the head is in a delivering position so that when the head is retracted to a receiving position the positioned splints are in a proper position to be forced into the receiving means of said head in prescribed relation with respect to said means.

A further novel feature of the invention consists in the provision of mechanism for effecting agitation of the contents of the feeder at a predetermined time or times with respect to the position of the setting head, in order to loosen and obtain a uniform and efficient discharge of the splints from the feeder into the positioning and receiving means or grooves of the setting head, said mechanism preferably performing its function by agitating the feeder.

A further novel feature of the invention consists in an improved means adapted to coöperate with the receiving portion of the setting head, desirably during its retraction, from a delivering to a receiving position, for the purpose of effecting discharge of imperfect splints.

The invention further consists in the provision of a two-part setting head having supporting or positioning, and receiving means, in combination with the improved mechanism for effecting agitation of the contents of the feeder at predetermined times and means for effecting discharge of imperfect splints.

The invention also includes an improved construction of dipping plate adapted for use in connection with an endless chain or carrier and so constructed as to facilitate the renewal of broken plates and decrease the liability of injury to the carrier, and to other plates, in case of accident.

The invention is characterized by other novel features of a subsidiary nature which will be more fully described in connection with the accompanying drawings and will be hereinafter more particularly pointed out and ascertained in and by the appended claims.

In the drawings:—Figure 1 is a front elevation of a portion of a machine embodying the main features of my invention. Fig. 2 is a sectional view on line 2—2 of Fig. 1. Fig. 3 is a sectional view on line 3—3 of Fig. 1 showing an improved one-piece setting head in a receiving position with respect to the feeder and also illustrating the dipping plate and carrier therefor and the means for ejecting imperfect splints. Fig. 4 is a view similar to Fig. 3 showing the setting head in a forward position and illustrating the ejecting and positioning means in operating positions. Fig. 5 is a sectional view on line 5—5 of Fig. 2 showing the means for effecting agitation of the contents of the feeder at predetermined times. Fig. 6 is a sectional view on line 6—6 of Fig. 5. Fig. 7 is a rear face view of one of the dipping plates associated with its carrier. Fig. 8 is a sectional view on line 8—8 of Fig. 7. Fig. 9 is a sectional view similar to Fig. 3 showing a two part setting head in a receiving position. Fig. 10 is a view similar to Fig. 9 showing the setting head in a forward position.

Like numerals of reference designate similar parts throughout the different figures of the drawings.

I will now proceed to describe specific embodiments of my invention but it will be understood that I do not wish to be limited by the specific structures shown except for such limitations as the claims import.

A main receptacle for receiving the splints in bulk is shown in the form of a hopper 1 provided on its opposite ends with arms 2 adapted to be secured to any convenient stationary part of the frame as at 3. In order to strengthen said arms ribs 4 are provided which preferably extend from the end walls of the hopper to the base portions of said arms and form convenient points of anchorage for devices hereinafter to be described. A feeder preferably in the form of a hopper 5 is located in receiving proximity to said hopper 1 and is provided with an interior portion equal in containing capacity, horizontally, to that of said hopper. Said feeder is provided with a plurality of partitions 6 transversely disposed with respect to its length and extending from the upper portion of said feeder downwardly to a point above the bottom thereof. Said partitions serve to prevent massing of the splints and also to retain them in a generally transverse position with respect to the length of the feeder so that the splints will be maintained in proper feeding relation with respect to the setting head.

Means are provided for effecting agitation of the contents of the feeder at a predetermined time or times with respect to the operation or position of the setting head, and, as shown, such agitation is desirably effected by imparting lateral movement to the feeder in the direction of its length, such movement consisting of short quick reciprocations. To this end the feeder 5 is provided at one end with an operating extension or arm 7 provided on its outer end with a cam roller 8 adapted to project between the walls and be operated by a double cam 9, as clearly shown in Fig. 5. The cam 9 is provided with straight and irregular portions 10 and 11, respectively, and during a portion of its rotation serves to maintain the feeder in the position shown in Fig. 5 and serves during the remainder of its rotation, or when the roller 8 is adjacent the irregular portion 11, to reciprocate or agitate the feeder 5. The cam 9 is so timed with respect to the operation of the setting head as to perform its function in the manner set forth with respect thereto, as will hereinafter more fully appear. Means is provided, preferably in the form of a set-screw 15, for adjusting the cam 9 on its shaft for timing the reciprocating motion of the feeder 5 to any desired period of movement of the setting head.

In order to maintain the feeder 5 in an upright position during its reciprocation and at periods of rest the arm 7 is mounted in a guide or way, the lower portion of which is formed by the frame member 3 and the upper portion of which is formed by the base of the arm 2. At its other end the feeder 5 is provided with an arm 12 mounted in the same manner in a guide or way formed by similar parts as those in which the arm 7 is mounted, said arm 12 however merely performing the function of a support for the feeder.

The splints descend by gravity from the hopper 1 to and through the feeder 5, and means are provided for receiving the splints from the feeder and delivering the same to the dipping plates, hereinafter described, in prescribed quantities, and according to my invention, said means serve to retain or support the contents of the feeder throughout the receiving and delivering operations. As shown in Figs. 1 to 6, said receiving means consists of a one piece reciprocating setting head indicated as a whole by 13. Said head 13 is provided with receiving and supporting portions, the former serving to receive the splints when the head is in a receiving position and the latter serving to support the contents of the feeder while the head is being reciprocated from a receiving to a delivering position and also during its retraction to a receiving position. As shown, the receiving portion of said head is indicated by 16 and the supporting portion by 17 and the receiving portion is preferably provided with a plurality of grooves 18 disposed in parallel relation and transversely arranged with respect to the length of the head. Said grooves are of a depth equal to the cross-section of the splints so that when the latter are in place they completely fill said grooves making the upper face of the receiving means flush. As shown in Figs. 3 and 4, the forward or receiving portion 16 of the head is somewhat shorter than the splints so the outer or forward ends of the latter project slightly beyond the head, as shown, in order to facilitate insertion into the dipping plate. The supporting portion 17 in the preferred construction also serves to position the splints and to this end it is provided with a plurality of positioning grooves 19 arranged in parallel relation and transversely disposed with respect to the length of said head. The said supporting portion 19 is, as shown, slightly greater in width than the feeder 5 and the length of travel of the head and the parts thereof are so proportioned with respect to the feeder 5 that either the receiving or the supporting portions 16 and 17 are at all times beneath the feeder and in such relation with respect to the feeder as to always support the contents thereof. The grooves 19 are relatively shallow with respect to the grooves 18 and the splints received by the grooves 19 project slightly above the upper portions thereof. Means are provided for engaging the rearmost ends of the splints in the grooves 19 so that when the head is retracted from a delivering to a receiving position the splints contained in the grooves 19 will be thrust into the grooves 18. In the embodiment shown the rear wall 20 of the feeder 5 embodies such means and is extended downwardly in such relation with respect to the grooves 19 as to engage the rear ends of the splints and hold them from being retracted with the head 13 so that when the latter approaches the position shown in Fig. 3 the splints will be immediately above and will fall into the grooves 18. In order to facilitate this operation the grooves 18 and 19 are arranged in alined relation so that the splints that have been received by the grooves 19 will have been positioned properly with respect to the grooves 18 and will be discharged thereinto, the positioning and receiving grooves being equal in number. The front wall 21 of the feeder 5 extends downwardly a sufficient distance to prevent superposed splints from being carried forwardly by the head 13 during its delivering movement. An off-set or shoulder portion 22 is provided at the rear end of the receiving grooves to positively force the splints therein into the dipping plate and such shoulder is conveniently formed by making the positioning and receiving grooves practically continuous, the increased depth of the receiving grooves with respect to the positioning grooves permitting the formation of such shoulder without employment of an additional part. The head 13 is provided with extensions 23 which project into and are guided in ways 24 formed by the frame members 3 and 25, respectively. Lugs 26, formed on said head 13, afford means of connection for pitmen 27 which may be connected and operated to and from any convenient source of power, not herein shown, in order to effect requisite movement of the setting head.

The operations of the setting head and the feeder are so timed that agitation of the feeder is effected and begins preferably when the head is in the position shown in Fig. 4; in other words, when the positioning grooves are beneath the feeder in a position to receive a set of splints and when the head is in a delivering position, i. e., when the splints of the receiving grooves are inserted in the dipping plate. Agitation of the feeder continues until the setting head reaches a receiving position as shown in Fig. 3, i. e., when the splints from the positioning grooves have been thrust into the receiving grooves and the latter are directly beneath the feeder. Upon the beginning of the forward movement of the setting head toward a delivery position agitation of the feeder ceases and the feeder remains in a position of rest until the head again reaches a delivering position as shown in Fig. 4 when it is again agitated in the manner hereinbefore set forth. It has been found in practice that continuous agitation of a body containing splints in bulk has the effect of tightly packing the splints in substantially solid masses, whereas, an intermittent agitation serves to loosen the splints. It is therefore undesirable to have continuous agitation, first, for the reason that it is necessary to loosen the splints only during certain positions of the setting head and, second, for the reason hereinbefore given that continuous agitation packs the splints and prevents a free and efficient feed. It will be obvious that if the feeder remains stationary only certain of the splints which happened to be in vertical alinement with the grooves would descend therein, whereas, by agitating the feeder the mass of splints is carried back and forth transversely across the face of the grooves and any splints which rest between the grooves are by this means moved laterally a sufficient distance to fall into the same. Now it will be obvious from the foregoing that a continuously agitated feeder would serve to pack the splints and would prevent this free movement of the splints across the grooves and would thereby preclude the very operation which an intermittently agitated feeder facilities and affords.

Referring to Figs. 3 and 4 it will be seen that by agitating the hopper at the beginning of the retractive movement of the setting head the splints are not only loosened but they are carried transversely of the grooves 19 and effectively fed thereinto. As the head retracts and the receiving grooves 18 reach the position shown in Fig. 3 continued agitation of the feeder has the effect of directly filling any of the receiving grooves 18 alining with such positioning grooves 19 as have not previously been filled. Therefore, it will be seen that the head has two opportunities to fill during each retraction from a delivering to a receiving position.

I will next describe the means whereby imperfect splints contained in the receiving grooves of the setting head are ejected.

An ejector, preferably in the form of a comb 28, is provided with a plurality of teeth 29 and is associated with the head 13 in such a manner as to coöperate with the receiving grooves therein and, as shown, said ejector moves in a direction angular to the direction of movement of said head. Said comb preferably consists of a flat plate and the teeth thereof are chamfered at 30 in a manner to present a relatively sharp edge to the splints. Inasmuch as the comb performs its function during a part of the operation of the setting head it is movably mounted, and means are provided for moving or actuating the comb at proper intervals to bring the same into and out of operative relation with the receiving grooves. As shown, and referring to Figs. 1 to 4, inclusive, said comb is provided with slots 31 through which bolts 32 project into a suitable stationary part such for instance as the hopper 1. The slots 31 are of sufficient length to afford requisite movement of the comb and the bolts 32 serve to retain the comb in a close working relation to the hopper 1 and the feeder 5. Cam operated mechanism is provided to assist in reciprocating the comb, and in the present embodiment said mechanism consists of a rocking bar 33 mounted at 34 in any convenient stationary parts and provided with arms 35, the outer ends of which are adapted to project into openings 36 formed in the comb. The arms 35 are spaced apart and extend forwardly from the bar 33 and beyond the outer ends of the dipping plates. A cam arm 37 provided with a roller 38 projects into operative relation with a cam 39 mounted on a shaft 40, the latter being operated from any convenient source of power. A spring 41 secured at one end to a convenient stationary part 42 and at its other end to the cam arm 37 serves to retain the roller 38 in engagement with the cam 39. The comb 28 is provided with lugs 43 projecting laterally from its ends, which lugs carry rods 44. Brackets 45 are secured at 46 to ribs 4 and project forwardly in alined relation with the lugs 43. The brackets 45 are apertured to receive the rods 44, which latter slide loosely in the brackets 45. Springs 47 are interposed between brackets 45 and the lugs 43. The cam mechanism just described performs the function of a retracting device and permits the springs 47 to throw the comb into an operative position at predetermined times and subsequently retracts the comb into an inoperative position.

I will next describe the construction of the dipping plates, reference being had to Figs. 7 and 8 of the drawings. In machines of this character the dipping plates are usually mounted upon an endless carrier, the several plates or units being successively brought into operative relation to the setting head for insertion of the splints. The relation of the dipping plates to the machine is clearly shown in Figs. 2, 3 and 4. Referring more specifically to the construction shown in Figs. 7 and 8, 48 designates the body portion of a plate which is provided with a plurality of splint receiving apertures 49 adapted to receive the splints inserted by the setting head. The body portions of said plates 48 are provided with angularly disposed attaching margins in the form of upturned flanges 50. The carriers for said dipping plates are in the form of rack links 51 there being two of said links to each dipping plate. Said links are provided at opposite ends with male and female lugs 52 and 53, respectively, whereby the rack links of one plate may be connected to those of an adjacent plate to form a continuous belt like structure. The flanges 50 are connected to the rack links by elements in the form of rivets 54 which pass through said flanges and into the teeth of said links. It will be seen from the foregoing that means are provided for readily detaching separate plates without disassembling or removing the carrier from its mounting. It will also be obvious that in case of accident the breakage of one of the dipping plates will not necessarily injure or in any way affect the carrier.

I will next describe the construction of the form shown in Figs. 9 and 10. In this form the setting head 55 performs its function in connection with a follower 56. The setting head 55 is provided with receiving grooves 57 and relatively short positioning grooves 58. The follower 56 is provided with positioning grooves 59 adapted to register with grooves 58. Both the head 55 and follower 56 are guided in ways 60 similar to ways 24. A follower stud 61 is secured in head 55 and extends loosely through follower 56, and there is interposed between the head of the stud and the follower 56 a spring 62 which serves normally to maintain the follower in engagement with the head, as shown in Fig. 9. A projection 63 secured to any convenient part of the rigid structure extends into the path of a lug 64 on the follower 56. When the head moves forwardly, as shown in Fig. 10, it carries the follower with it until the lug 64 strikes the projection 63, as clearly shown in Fig. 10.

The operation is as follows: Assuming that the parts are in a position shown in Fig. 4 and that the hopper and feeder are filled with splints in bulk, it will be seen that the positioning grooves 19 will first be filled, or substantially so, with splints from the feeder, which at this point begins its agitating movement. As the head is retracted to the position shown in Fig. 3 the rear wall 20 engages the rear ends of the splints in the positioning grooves and serves through retracting movement of the head to force said splints into the receiving grooves 18 such operation being completed when the shoulder 22 has passed the rear wall 20, as shown in Fig. 3. At this point the splints in all of the positioning grooves that were initially filled have been deposited in the receiving grooves but continued agitation of the contents of the feeder will serve to fill any empty receiving grooves when the head is in the position shown in Fig. 3 thereby assuring as far as possible a capacity delivery at each feeding or delivering reciprocation of the head. Assuming now that the head is filled and is moving forwardly toward the dipping plate it will be noted that agitation of the feeder ceases until the head is in the position shown in Fig. 4 whereupon all of the splints of the required length will have been inserted in the dipping plate. It is well known that splints in bulk contain many splinters and sticks of imperfect length, and that it is desirable to sort these imperfect splints and prevent their delivery to the dipping plates. The movement of the head and the position of the dipping plates with respect thereto are so proportioned that when the setting head is in an extreme forward position the shoulder 22 causes insertion in the dipping plate only of those splints which are of the required length. Splinters or splints of imperfect length will therefore remain in the grooves 18, and after the setting head has been withdrawn slightly from an extreme forward position to the position shown in Fig. 4, the free ends of the splints inserted in the dipping plate will lie outwardly beyond or from under the comb 28 while the imperfect splints that were too short to reach the dipping plate will still remain in their original position in the receiving grooves with their inner ends engaging the shoulder 22 and lying directly beneath the teeth of the comb. Assuming now that the head is retracted to the position shown in Fig. 4 the comb 28 will be freed by the cam 39 and will descend under the action of springs 47 so that its teeth will impinge imperfect or short splints remaining in the grooves 18, thereby preventing said splints from being retracted with the setting head. After the setting head has passed beneath the comb 28 the latter is raised under the action of the cam 39, as shown in Fig. 3, and the broken or imperfect splints are discharged by gravity between the forward end of the setting head and the dipping plates into any suitable receptacle. The dipping plates now move upwardly a sufficient distance to bring the next series of openings into horizontal alinement with the grooves 18 and the operation of the parts hereinbefore set forth is repeated.

Reference will now be had to Figs. 9 and 10 and the operation of the form therein shown will be described. Assuming that the parts are in the position shown in Fig. 10 the feeder 5 will commence its agitating movement serving to loosen the splints and also draw the same laterally in opposite directions across the face of the grooved portions 58 and 59 which constitute the positioning grooves. All of the splints of uniform length will be discharged and will rest at opposite ends in the positioning grooves. Those splints of imperfect length will fall between the follower 56 and the head 55 into any suitable receptacle. As the head 55 retracts the wall portion 20 will gradually force the splints from the grooves 58 and 59 into the grooves 57, the completion of this operation resulting when the parts are in the position shown in Fig. 9. In the meantime, however, the follower 56 will be held in the position shown in Fig. 10 by springs 62 until engaged and retracted by the head 55 into the position shown in Fig. 9. Agitation of the feeder continues up to this point in order to fill any of the grooves 57 which have not been filled in the first part of the retracting movement from the positioning grooves. Assuming now that the head advances to a delivering position and that agitation of the feeder ceases, all of the splints of uniform length will be inserted in the dipping plate and the head will retract and after a slight retraction the comb 28 will descend to perform its function in the same manner as hereinbefore described in connection with the preferred form. At this point it should be stated that many splints which are of imperfect length will be sufficiently long to engage the grooves 58 and 59 and will not be discharged between the head and follower, and it is this class of splints which the comb 28 serves to eject in this form of the device. This form of the device has the advantage in that all of the very short splints are ejected and are not initially delivered to the setting head. Therefore a machine of this character has a relatively increased delivering capacity since the comb is not called upon to eject any splints except those which are not quite the required length. Thus the setting head contains a greater proportion of splints of the required length and the capacity of the machine is thereby proportionately increased.

I claim:—

1. A splint setting machine comprising in combination, a movably mounted feeder containing a mass of superposed splints, a setting head receiving the splints from and movable beneath said feeder to delivering and receiving positions, and means for continuously agitating said feeder during retraction of said head from a delivering to a receiving position, said means holding said feeder in a position of rest throughout the remaining periods of movement of said head.

2. A splint setting machine comprising in combination, a splint feeder, a one piece setting head movable beneath said feeder and provided with a forward portion having a plurality of receiving grooves and a rear portion having positioning grooves substantially equal to the length of said splints, means for reciprocating said head into receiving and delivering positions, and means for removing imperfect splints from said receiving grooves.

3. A splint setting machine comprising in combination, a splint chain for receiving the splints, a splint feeder having an open bottom, a one piece setting head movable beneath said feeder and provided with a rear portion having positioning grooves equal in length to the length of the splints and a forward portion provided with receiving grooves alined with said positioning grooves, said head having a shoulder at the rear of said receiving grooves for engaging the ends of the splints therein, means for advancing the head toward the chain to deliver the splints and bring the positioning grooves abreast of the bottom of said feeder and retracting said head to bring the receiving grooves beneath said feeder and retract the positioning grooves to the rear thereof, means for transferring the splints from the postitioning to the receiving grooves during retraction of said head, and means for removing imperfect splints from said receiving grooves during retraction of said head.

4. A splint setting machine provided with a splint feeder, a horizontally disposed one-piece setting head arranged under said feeder and provided on its top face with two sets of grooves of different depths for receiving and positioning the splints, means for actuating said head so as to deliver the splints thereon, and means for dislodging imperfect splints which stick in said head.

5. A splint carrier consisting of pairs of links pivotally connected in a series and provided with integral rack teeth, a relatively thin perforated dipping plate arranged between each pair of links and provided on its side edges with integral thickened portions which are of approximately the same thickness as said links, and fastening devices passing transversely through the thickened portions on the plate and through the links for connecting the plate to the links, said fastening devices lying parallel to the body portion of the plate.

In testimony whereof I affix my signature in presence of two witnesses.

BERNARD G. VAUGHAN.

Witnesses:
JOHN H. GARNSEY,
CARL M. CRAWFORD.

---

Copies of this patent may be obtained for five cents each, by addressing the "Commissioner of Patents, Washington, D. C."